United States Patent [19]

De Keyzer et al.

[11] Patent Number: 4,897,689

[45] Date of Patent: Jan. 30, 1990

[54] PHOTOGRAPHIC EXPOSURE APPARATUS INCLUDING A MEANS FOR THE RELATIVE POSITIONING OF A PHOTOGRAPHIC MATERIAL AND AN ORIGINAL IN SHEET FORM

[75] Inventors: Francis J. De Keyzer, Bornem; Jean P. Moelants, Edegem, both of Belgium

[73] Assignee: AGFA-Gevaert, N.V., Mortsel, Belgium

[21] Appl. No.: 642,884

[22] Filed: Aug. 21, 1984

[30] Foreign Application Priority Data

Sep. 2, 1983 [EP] European Pat. Off. ........... 83201261

[51] Int. Cl.$^4$ .............................................. G03B 27/02
[52] U.S. Cl. ......................................... 355/79; 355/78
[58] Field of Search .............................. 355/77, 79, 78

[56] References Cited

U.S. PATENT DOCUMENTS 2,055,207  9/1936  Roullard ................................. 355/78
2,781,598  2/1957  Plastaras ................................ 355/78
3,353,281  11/1967  Schulze ................................. 355/79

FOREIGN PATENT DOCUMENTS 840738  7/1960  United Kingdom ................. 355/79

Primary Examiner—Monroe H. Hayes
Attorney, Agent, or Firm—A. W. Breiner

[57] ABSTRACT

A photographic exposure apparatus comprising a support serving as a carrier for sheet material which is an original, or a photographic material, or is an original together with a photographic matrial; and a translucent positioning sheet for covering at least partially said support and which is adapted to engage a corner of said sheet material, characterized in that said translucent positioning sheet is provided with a pair of locating means spaced apart from each other so as to engage two neighbouring corners of said sheet material, whereby said sheet material may be located in a predetermined position, the said positioning sheet being attached to the said support.

6 Claims, 2 Drawing Sheets

PHOTOGRAPHIC EXPOSURE APPARATUS INCLUDING A MEANS FOR THE RELATIVE POSITIONING OF A PHOTOGRAPHIC MATERIAL AND AN ORIGINAL IN SHEET FORM

The present invention relates to a photographic exposure apparatus, particularly for use in graphic art reproduction or printing-plate preparation, which photographic exposure apparatus comprises a support serving as a carrier for sheet material which is an original or a photographic material, or an original together with a photographic material and which is provided with a translucent positioning sheet for such sheet material.

One type photographic exposure apparatus for graphic-art reproduction is the so-called process camera, which contains a lens or lens exposure system located between an original holder and an image plane. In operating of such a camera the original is positioned on a glass plate copy holder and the photographic material is positioned on the image-plane for example between a glass plate serving as the image plane and a pivotable light-tight cover plate of the camera or the image is reflected through a lens system into a web of film moving in the image plane.

In another type photographic exposure apparatus, known as a contact-exposure camera, the original in sheet form (e.g. document) to be copied is placed over a sheet of photographic material and exposure is effected through the original (direct exposure) or through the photographic material towards the original (reflex exposure).

The contact-exposure camera is particularly useful for the exposure of photographic materials that may subsequently be used in the production of a silver image by the silver complex diffusion transfer process e.g. in the production of a planographic printing plate. Such a printing plate when produced on an aluminum base is relatively expensive and therefore it is important that the information content, e.g. text image, derived from the exposure stage, is correctly positioned, since alignment of the plate on the printing press is a difficult and cumbersome process.

In a document reproduction camera the photographic material is kept flat during the exposure between a glass plate serving as a transparent support and a light-tight vacuum-operated frame back exerting pressure on the photographic material. As a result of vacuum suction on the said frame, the photographic material, e.g. film, is held in close contact with the image plane, so that it is exposed in perfectly flat condition.

The positioning of the original with respect to the photographic material is usually effected with a ruled positioning sheet.

One proposal is described in DBGM (Deutsches Bundesrepublik Gebrauchsmuster) 1,958,026, in which a translucent positioning sheet is provided which is in the form of a pocket sealed on two adjacent sides, the sealed corner being obliquely cut off so as to receive a corner of photographic material inserted in the pocket. Such positioning means requires the photographic sheet, whatever its size, to be located in one position only and no provision is made for engaging an original.

According to another known embodiment, a transparent ruled positioning sheet is attached at one edge to a pivotable light-tight cover plate of the process camera. The copy-board, also called copy holder contains also a ruled pattern that is arranged symmetrically with respect to the pattern applied to the image plane. However, abrupt closing of the camera cover may result in a shift in positioning and consequently lead to a misaligned exposure.

It is an object of the present invention to provide a photographic exposure apparatus including a means for the relative positioning of a photographic material with respect to a sheet-like original wherein said means serves as a holder for said photographic material and/or original obviating thereby relative shifting of said material and original.

The present invention thus provides a photographic exposure apparatus comprising a support serving as a carrier for sheet material which is an original, or a photographic material, or is an original together with a photographic material; and a translucent positioning sheet for covering at least partially said support and which is adapted to engage a corner of said sheet material, characterized in that said translucent positioning sheet is provided with a pair of locating means spaced apart from each other so as to engage two neighboring corners of said sheet material, whereby said sheet material may be located in a predetermined position, the said positioning sheet being attached to the said support.

In a particularly advantageous embodiment, a plurality of pairs of said locating means are provided on said translucent positioning sheet, the locating means of each of said pair being spaced apart to a different degree so that sheet materials of different sizes may be located by said positioning sheet.

In an embodiment of the present invention one pair of said locating means is provided so as to engage two neighboring corners of a photographic material and another pair of said locating means is provided so as to engage two neighbouring corners of an original whereby said original and photographic material may be located in a predetermined position relative to each other.

According to a preferred embodiment said locating means are pairs of apertures e.g. pairs of oppositely disposed oblique slots, orientated so as to receive neighboring corners of said sheet material. In yet another embodiment the locating means are holders attached to the positioning sheet for allowing separate or combined insertion of said neighbouring corners of said sheetlike materials.

The invention is further illustrated by FIGS. 1 to 5.

FIGS. 1 to 3 each represent a positioning sheet arrangement for use e.g. in a contacts exposure camera.

Figure 1:
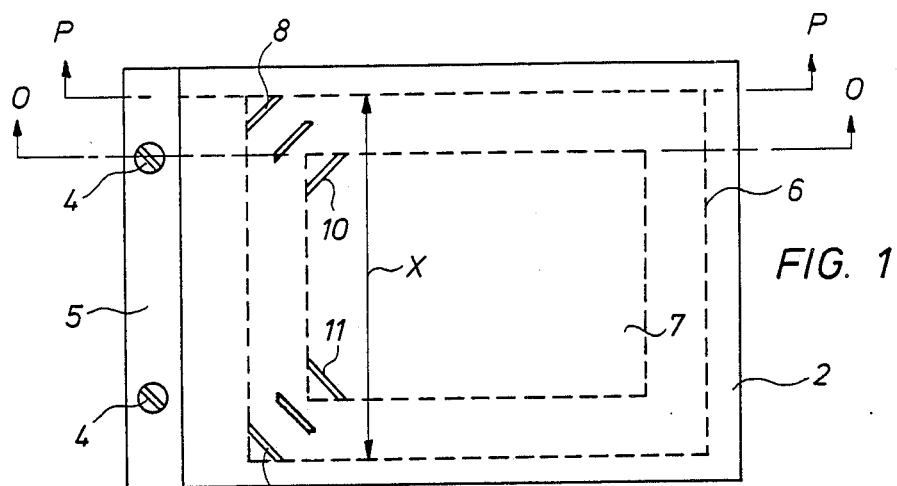

FIG. 1 more particularly represents a top view of a camera, e.g. contact-exposure camera, having on top of its image plane a positioning sheet 2 being a translucent film, including a matt polyester film (e.g. a commercial drawing film) in which pairs of oblique slots are cut as shown in the top view. One side of sheet 2 is fixed to frame 3 of the glass plate 1 by means of screws 4 and strip 5. Another method for fixing is provided by sticking an edge of positioning sheet 2 with a proper adhesive to frame 3.

In FIG. 1 the photographic material 6 (a silver halide emulsion film with transparent support for enabling reflex-exposure through its rear side) is larger than the original 7 and inserted with two of its neighbouring corners into a pair of slots 8 and 9 separate by a distance corresponding with the width X of the film. Original 7 likewise has two of its neighboring corners inserted in two other slots 10 and 11 so as to lie face down with its image markings towards the silver halide emulsion layer. The edges (dashed lines) of photographic material 6 and original 7 are thus kept parallel. In order to facilitate the recognition of the corresponding pairs of slots under darkroom conditions (red light) they may be numbered with the same number in the margin of the positioning sheet.

Figure 2:
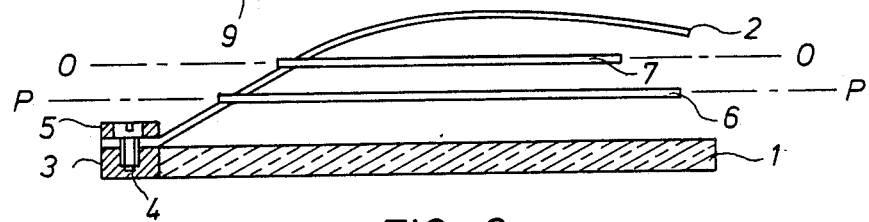

FIG. 2 represents a sectional view along the lines O—O and P—P of FIG. 1. The positioning sheet 2 covering glass plate 1 has been lifted to show the insertion of the photographic material 6 and original 7 in the slots 8 and 9 and 10 and 11 respectively.

Figure 3:
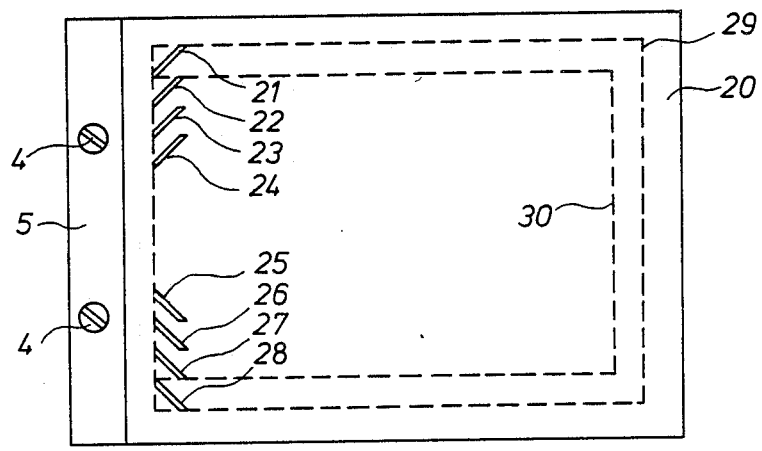

FIG. 3 represents a modified embodiment of the arrangement of FIG. 1, wherein a positioning sheet 20 contains two rows of oblique parallel slots 21 to 24, and 25 to 28 disposed in relation to each other whereby different formats of film 29 and/or original 30 (dashed line) can be held by insertion therein of neighbouring corners.

In the arrangements of FIGS. 1 to 3 the photographic material and original are laid on top of each other for a contact exposure.

Figure 4:
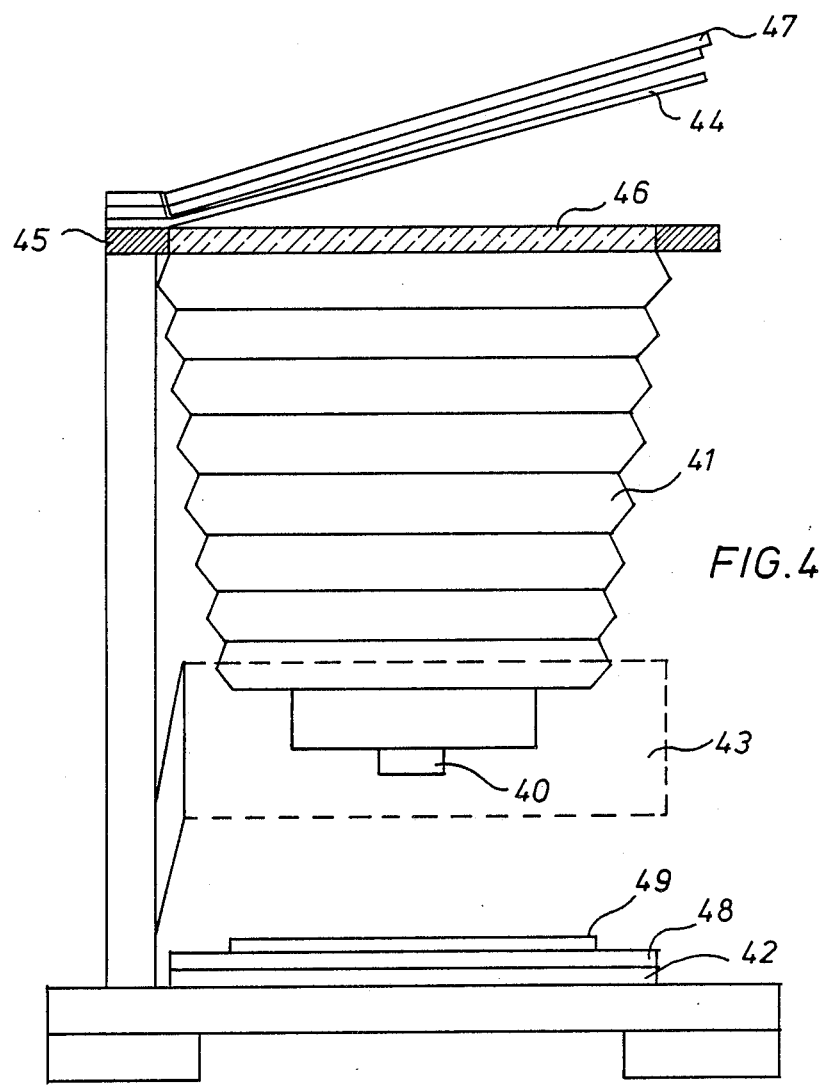
FIG. 4 represents a schematical view of a process-camera including a position in sheet arrangement according to the present invention.

A process camera represented by side view in FIG. 4 comprises a lens system 40 movable with a bellow 41 with respect to a copy board 42 having sidewardly arranged exposure lamps in reflectors 43 (shown in dash line). A positioning sheet 44 provided with pairs of slots as represented in FIG. 1 is fixed along one of its edges to the frame 45 of the image plane (glass plate) 46, so that the positioned photographic material (not shown in the drawing) and the positioning sheet 44 on top of it can be pressed by the frame back (camera cover) 47 against the glass plate 46. A further positioning sheet 48 is arranged on the copy board 42. The use of a hinge-like method of fixing for making the positioning sheet liftable to cover the original 49 has little practical value, since the original 49 is placed on top of the positioning sheet 48.

Figure 5:
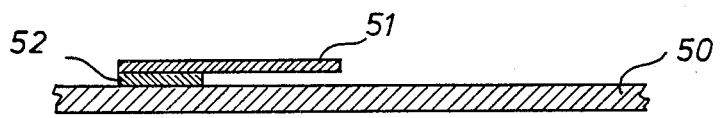
FIG. 5 represents a detailed sectional view of a positioning sheet area carrying sheet-holder means attached onto said positioning sheet.

FIG. 5 represents a cross-sectional drawing of a positioning sheet part 50 carrying a triangular sheet-corner-holder 51 in the form of a triangular sheet piece, which may be made of plastic material fixed with an adhesive 52 to the positioning sheet part 50 leaving room for the insertion of a corner of a material in sheet form.

A survey of photographic cameras including a glass plate as image plane is given in the book: "Ilford Graphic Arts Manual" vol. I, by H. M. Cartwright, Ilford Limited, Ilford Essex, Great Britain (1st reprint 1962) p. 82–87, under the heading "Process Cameras" and "Gallery Camera". Such cameras are ruggedly constructed and mounted so as to minimize vibration (ref. Graphic Arts handbook and Products Manual - compiled and edited by George A. Stevenson, published by Pen and Press Publications, Inc. 22419 Hallidale Avenue, Torrance, Calif.- USA (1960) p. 255.

A description of contact-"direct"-copying and contact-"reflex"-copying and equipment therefor is given by William R. Hawken in the book "Copying Methods Manual"- Library Technology Program, American Library Association - Chicago - (1966) p. 212-227. On page 226 of said book a contact-exposure camera is described in which the "sensitized material" is kept in place with tape.

We claim:

1. A photographic exposure apparatus comprising a support which serves as a carrier for sheet material which is an original, or a photographic material, or is an original together with a photographic material; and a translucent positioning sheet for covering at least partially said support, wherein said translucent positioning sheet is provided with a plurality of pairs of apertures spaced apart from each other so as to engage two neighboring corners of said sheet material, and each said pair being spaced apart to a differing degree so that sheet materials of differing sizes may be located by said positioning sheet, the said positioning sheet being attached to the said support along one edge or at one corner.

2. Apparatus according to claim 1, wherein one pair of said apertures is provided so as to engage two neighboring corners of a photographic material and another pair of said locating means is provided so as to engage two neighboring corners of an original whereby said original and photographic material may be located in a predetermined position relative to each other.

3. Apparatus according to claim 1, characterized in that the said apertures consist of pairs of oppositely-disposed oblique slots orientated so as to receive neighboring corners of said sheet material.

4. Apparatus according to claim 1, which is a contact exposure camera or a camera provided with a lens exposure system, and the said support is a glass plate.

5. Apparatus according to claim 2, which is a contact exposure camera or a camera provided with a lens exposure system, and the said support is a glass plate.

6. Apparatus according to claim 3, which is a contact exposure camera or a camera provided with a lens exposure system, and the said support is a glass plate.

* * * * *